(12) United States Patent
Nagumo et al.

(10) Patent No.: US 8,591,037 B2
(45) Date of Patent: Nov. 26, 2013

(54) PROJECTOR WITH A TURBO FAN ROTATABLE ABOUT A VERTICAL AXIS

(75) Inventors: Toshihiko Nagumo, Shiojiri (JP); Hideki Takasuka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 215 days.

(21) Appl. No.: 13/071,854

(22) Filed: Mar. 25, 2011

(65) Prior Publication Data

US 2011/0234991 A1    Sep. 29, 2011

(30) Foreign Application Priority Data

Mar. 29, 2010  (JP) ................... 2010-075017

(51) Int. Cl.
G03B 21/18  (2006.01)
(52) U.S. Cl.
USPC .......... 353/57; 353/52; 353/60; 353/61; 362/264; 362/294; 361/676; 361/679.46
(58) Field of Classification Search
USPC ............ 353/52, 57–58, 60–61, 119, 122; 361/676, 679.46, 679.48, 649.54, 688, 361/695, 697; 362/96, 218, 322, 547, 264, 362/294, 345, 373; 349/5, 7–9; 416/5
See application file for complete search history.

(56) References Cited

U.S. PATENT DOCUMENTS

| | | | |
|---|---|---|---|
| 6,840,628 B2 | 1/2005 | Arai et al. | |
| 7,237,906 B2* | 7/2007 | Morimoto et al. | 353/61 |
| 7,252,416 B2* | 8/2007 | Katayama et al. | 362/373 |
| 8,038,302 B2* | 10/2011 | Okoshi | 353/58 |
| 2007/0242453 A1* | 10/2007 | Suzuki | 362/218 |
| 2008/0180910 A1* | 7/2008 | Tomioka | 361/695 |
| 2010/0172098 A1* | 7/2010 | Isoshima et al. | 361/697 |

FOREIGN PATENT DOCUMENTS

| | | |
|---|---|---|
| CN | 1463386 A | 12/2003 |
| JP | A-2005-242156 | 9/2005 |

* cited by examiner

Primary Examiner — Georgia Y Epps
Assistant Examiner — Sultan Chowdhury
(74) Attorney, Agent, or Firm — Oliff & Berridge, PLC

(57) ABSTRACT

A projector includes: an external housing; and an exhaust fan configured to suck an air within the external housing and discharges the sucked air to the outside, the external housing has a top and bottom surface crossing a vertical axis, an air discharge port through that the air discharged from the exhaust fan is discharged to the outside, and a side surface that connects the top surface and the bottom surface, the exhaust fan constituted by a turbo fan that has an impeller rotatable around a predetermined rotation axis, and the rotation axis extends along the vertical axis.

7 Claims, 4 Drawing Sheets

PROJECTOR WITH A TURBO FAN ROTATABLE ABOUT A VERTICAL AXIS

CROSS-REFERENCE

The entire disclosure of Japanese Patent Application No. 2010-075017 filed Mar. 29, 2010 is expressly incorporated by reference herein.

BACKGROUND

1. Technical Field

The present invention relates to a projector.

2. Related Art

A projector which prevents temperature increase within its external housing by discharging air from the inside of the external housing to the outside by the function of an exhaust mechanism having a cooling fan is known (for example, see JP-A-2005-242156).

The exhaust mechanism disclosed in JP-A-2005-242156 includes a cooling fan constituted by a so-called axial fan whose air intake direction and discharge direction extend along the rotation axis of the fan. The axial fan is provided in such a condition that the rotation axis of the fan extends along the horizontal axis within the external housing (along the top surface or the bottom surface crossing the vertical axis of the external housing).

According to the projector shown in JP-A-2005-242156 which includes the axial fan disposed at the position described above, the size of the axial fan needs to be reduced when the thickness (distance between the top surface and the bottom surface) is desired to be decreased.

However, since the capacity of the air intake quantity or the like of the axial fan is determined by its size, the capacity of the axial fan lowers when the thickness of the projector is reduced. In this case, prevention of the temperature increase within the external housing is difficult.

SUMMARY

An advantage of some aspects of the invention is to provide a projector which achieves reduction of its thickness while preventing temperature increase within its external housing.

A projector according to an aspect of the invention includes: an external housing; and an exhaust fan configured to suck air within the external housing and discharges the sucked air to the outside. The external housing has a top and bottom surface crossing a vertical axis, an air discharge port through that the air discharged from the exhaust fan is discharged to the outside, and a side surface that connects the top surface and the bottom surface. The exhaust fan constituted by a turbo fan that has an impeller rotatable around a predetermined rotation axis. The rotation axis extends along the vertical axis.

According to this structure, the exhaust fan is constituted by a turbo fan, and is disposed such that the rotation axis of the impeller extends along the vertical axis.

Thus, the thickness of the projector can be reduced without lowering the performance of the exhaust fan, that is, while preventing temperature increase within the external housing.

It is preferable that the exhaust fan has a first air inlet port and a second air inlet port provided such that the first and second air inlet ports arranged along the rotation axis with the impeller interposed between, the first and second air inlet ports, and is disposed in such a position that a first clearance is formed between the first air inlet port and the top surface and that a second clearance is formed between the second air inlet port and the bottom surface in the projector of the above aspect of the invention.

According to this structure, the exhaust fan is constituted by a double-sided turbo fan which has the first air inlet port and the second air inlet port, and is disposed in such a position that the first and second clearances are formed between the exhaust fan and the top surface and between the exhaust fan and the bottom surface, respectively.

In this case, air within the external housing can be effectively sucked through both the top surface and the bottom surface without remaining inside the external housing. Thus, temperature increase within the external housing can be effectively prevented.

Moreover, this structure allows the air sucked by the exhaust fan to flow along the rear surfaces of the top surface and the bottom surface. Thus, temperature increase of the top surface and the bottom surface can also be avoided.

It is preferable that the exhaust fan is so structured that a first air intake quantity introduced through the first air inlet port is different from a second air intake quantity introduced through the second air inlet port, and that the magnitude relationship between the first clearance and the second clearance is set opposite to the magnitude relationship between the first intake quantity and the second intake quantity in the projector of the above aspect of the invention.

According to this structure, the length of the first clearance is made smaller than the length of the second clearance when the first air intake quantity is larger than the second air intake quantity, for example.

In this case, the quantities of airs flowing on the top surface side and the bottom surface side can be balanced against each other by providing the smaller clearance on the side where the air intake quantity is large. That is, air flows along the top surface and the bottom surface with a good balance. Accordingly, the exhaust fan can efficiently suck air within the external housing.

It is preferable that the projector of the above aspect of the invention further includes a light source device disposed within the external housing to emit light. In this case, it is preferable that the followings are satisfied. The exhaust fan sucks the air heated by the light source device and discharges the sucked air to the outside through the air discharge port. The top surface and the bottom surface form a part of a duct configured to guide the air heated by the light source device toward the exhaust fan. A communication hole configured to communicate with a air flow channel from the light source device to the exhaust fan to introduce air from the outside of the external housing into the channel is formed at least either on the top surface or on the bottom surface.

According to this structure, the communication hole is formed at least either on the top surface or on the bottom surface. Thus, air can be introduced from the outside of the external housing through the communication hole into the air flow channel from the light source device to the exhaust fan by driving the exhaust fan. This structure causes mixture of the air heated by the light source device and the air outside the external housing, and thus decreases the temperature of the air sucked by the exhaust fan. In this case, the possibility that the exhaust fan takes in high-temperature air lowers, which prevents heat deterioration of the exhaust fan and the air discharge port.

It is preferable that the light source device is disposed in such a position that a third clearance is formed between the light source device and at least either the top surface or the bottom surface in the projector of the above aspect of the invention. In this case, it is preferable that the communication hole is formed at a position corresponding to the position of the light source device as viewed in the direction along the vertical axis to connect the third clearance and the outside of the external housing.

According to this structure, the communication hole is formed at the position described above. Thus, the air heated by the light source device can be mixed with the air outside the external housing at an upstream position of the channel of air flowing from the light source device to the exhaust fan. Thus, the temperature of the air sucked by the exhaust fan can be effectively decreased.

Moreover, in the structure which has the communication hole at the position described above, temperature increase of the air in the vicinity of the light source device can be effectively prevented by using the air introduced from the outside of the external housing through the communication hole.

Furthermore, temperature increase of the areas of the top surface and the bottom surface corresponding to the position of the light source device can be avoided by using the air introduced from the outside of the external housing through the communication hole.

It is preferable that the projector of the above aspect of the invention further includes a projection device disposed within the external housing to project an image. In this case, it is preferable that the air discharge port is provided on the side surface of the side that the image is projected, the impeller has a plurality of vanes, and the exhaust fan is provided in such a condition that the moving direction of the plurality of vanes on the air discharge port side corresponds to a direction away from the projection device.

According to this structure which disposes the exhaust fan in the condition described above, interference between exhaust airflow discharged from the exhaust fan via the air discharge port to the outside of the external housing and an image projected from the projection device can be avoided. Thus, a projection image can be displayed in a preferable condition without deterioration of the quality of the projection image displayed on the screen.

It is preferable that the projector of the above aspect of the invention further includes a light source device disposed within the external housing to emit light. In this case, it is preferable that the exhaust fan is disposed on a line connecting the position of the air discharge port and the position of the light source device.

According to this structure, the exhaust fan disposed at the position described above blocks light leaking from the light source device, and thus prevents leakage of the light to the outside of the external housing through the air discharge port.

In this case, the necessity of equipping a light shield louver on an air discharge duct or an air discharge port provided on the air discharge side of an axial fan as required in a related-art exhaust mechanism, which is described in JP-A-2005-242156, is eliminated, which simplifies the exhaust mechanism. That is, the structure which does not include the light shield louver on the air discharge duct or the air discharge port contributes to reduction of the size, weight, and cost of the projector.

Moreover, the structure which does not have the light shield louver eliminates air resistance produced by the light shield louver. Thus, air discharged from the exhaust fan can be discharged via the air discharge port to the outside of the external housing without pressure loss. Accordingly, the projector secures a sufficient level of silence without generating noise associated with air resistance.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
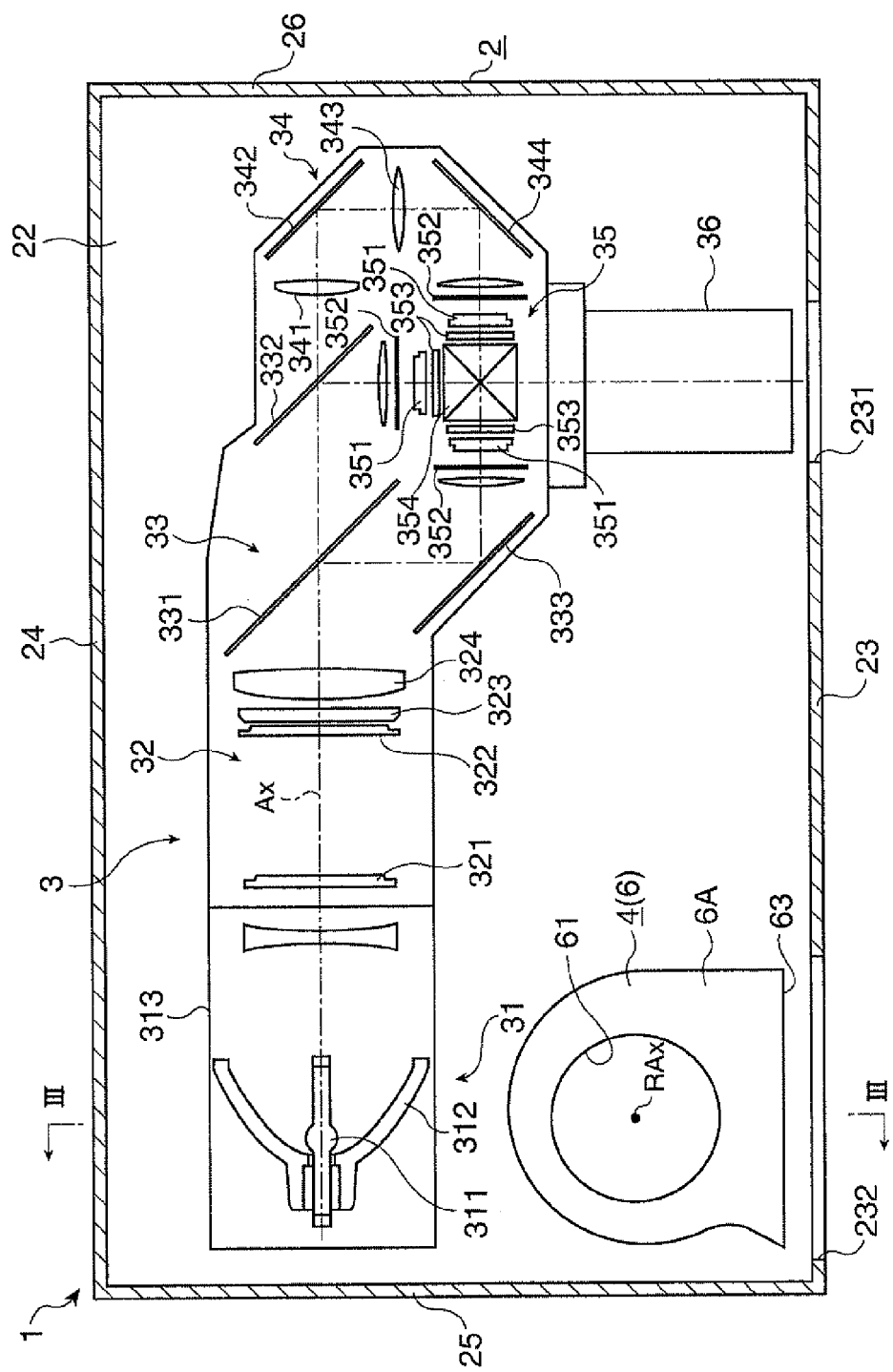
FIG. 1 schematically illustrates the internal structure of a projector according to an embodiment.

An exemplary embodiment according to the invention is hereinafter described with reference to the drawings.
Structure of Projector FIG. 1 schematically illustrates the internal structure of a projector 1 according to this embodiment. More specifically, FIG. 1 shows the internal structure of the projector 1 as viewed from a top surface 21.

In the following description, the side on which a projection lens 36 described later is disposed corresponds to the "front surface" side, and the side opposite to the front surface side corresponds to the "rear surface" side for convenience of explanation.

A "vertical axis" in the following description refers to the direction in which the weight of the projector 1 is applied when the projector 1 is placed on an installation surface such as a desk (direction crossing the sheet surface of FIG. 1 at right angles).

The projector 1 modulates light according to image information and projects the light on a screen (not shown). As illustrated in FIG. 1, the projector 1 includes an external housing 2 constituting an exterior, and an optical unit 3 and an exhaust fan 4 disposed within the external housing 2.
Structure of External Housing As illustrated in FIG. 1, the external housing 2 has the top surface 21 (see FIGS. 3 and 4) and a bottom surface 22 crossing the vertical axis, and side surfaces through 26 (including the front surface 23 corresponding to the front side surface and the rear surface 24 corresponding to the rear side surface) connecting the top surface 21 and the bottom surface 22 to form a substantially rectangular parallelepiped shape.

As illustrated in FIG. 1, the front surface 23 has an image opening 231 through which an image projected from the projection lens 36 (described later) of the optical unit 3 passes.

The front surface 23 further has an air discharge port 232 on the left side of the image opening 231 as viewed from the front surface side (on the front surface side of a light source device 31 described later) as a port through which air within the external housing 2 is discharged to the outside.
Structure of Optical Unit The optical unit 3 is a unit for modulating light according to image information (image signal) and projects the modulated light. As illustrated in FIG. 1, the optical unit 3 has a substantially L shape in the plan view which extends along the rear surface 24 with one end of the optical unit 3 projecting toward the front surface 23.

As illustrated in FIG. 1, the optical unit 3 includes the light source device 31 which has a light source lamp 311, a reflector 312, and a lamp housing 313; an illumination device 32 which has lens arrays 321 and 322, a polarization converting element 323, and a superposing lens 324; a color separation device 33 which has dichroic mirrors 331 and 332, and a reflection mirror 333; a relay device 34 which has an entrance side lens 341, a relay lens 343, and reflection mirrors 342 and 344; an optical device 35 which has three liquid crystal panels 351 as light modulation devices, three entrance side polarization plates 352, three exit side polarization plates 353, and a cross dichroic prism 354 as a color combining device; and the projection lens 36 as a projection device.

According to the optical unit 3 thus constructed, light emitted from the light source device 31 passes through the illumination device 32, and is separated into three color lights in R, G, and B by the color separation device 33. The respective separated color lights are modulated by the corresponding liquid crystal panels 351 according to image information. The respective modulated color lights are combined by the prism 354 into an image to be projected on the screen by the projection lens 36.

Structure of Exhaust Fan

Figure 2:
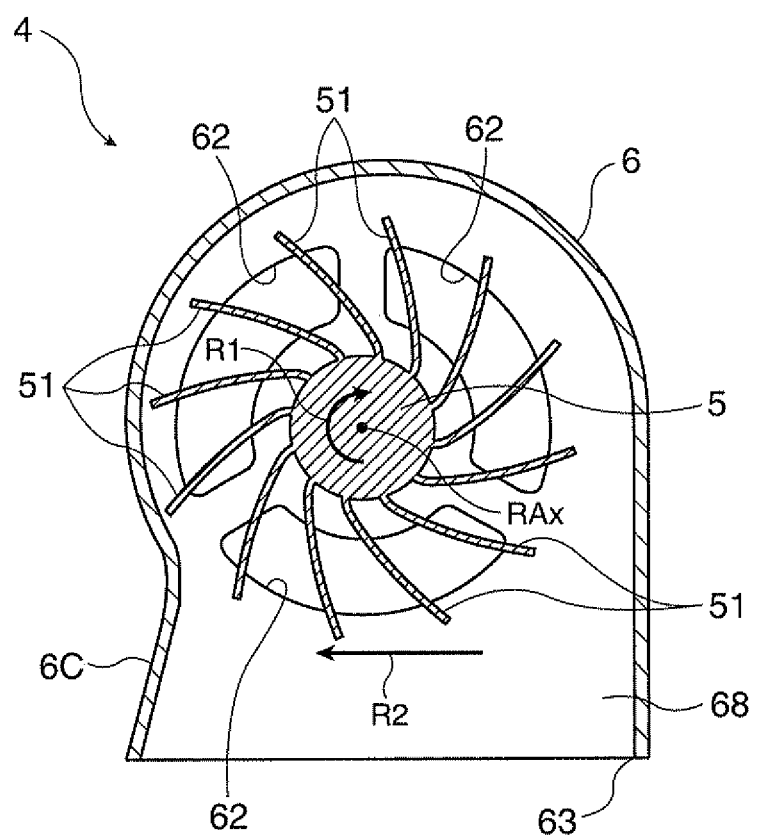
FIG. 2 is a cross-sectional view schematically showing the structure of an exhaust fan according to the embodiment.

FIG. 2 is a cross-sectional view schematically showing the structure of the exhaust fan 4. More specifically, FIG. 2 is a cross-sectional view of the exhaust fan 4 as viewed from the top surface 21.

The exhaust fan 4 discharges high-temperature air remaining within the external housing 2 to the outside through the air discharge port 232.

As illustrated in FIG. 2, the exhaust fan 4 has an impeller 5 and a casing 6.

The impeller 5 has a plurality of vanes 51 formed integrally with the outer circumference of the impeller 5. The impeller 5 is supported within the casing 6 in such a condition as to be rotatable around a rotation axis RAx (FIG. 2).

The plural vanes 51 are so shaped as to be bended toward the back with respect to a rotation direction R1 (FIG. 2) of the impeller 5.

Thus, the exhaust fan 4 is constituted by a so-called turbo fan.

The casing 6 is a component for accommodating the impeller 5 inside.

End surfaces 6A (FIG. 1) and 6B (FIG. 2) of the casing 6 crossing the rotation axis RAx have a first air inlet port 61 (FIG. 1) and a second air inlet port 62 (FIG. 2), respectively.

More specifically, the air inlet port 61 and the air inlet port 62 are disposed in such positions as to arrange along the direction of the rotation axis RAx with the impeller 5 interposed between the air inlet port 61 and the air inlet port 62.

As illustrated in FIGS. 1 and 2, a side surface 6C of the casing 6 connecting the end surfaces 6A and 6B has an air outlet port 63.

In addition, a driver circuit (circuit board) which receives electric power from the outside via a lead and rotates the impeller 5 around the rotation axis RAx is provided on the end surface 6B, though the driver circuit is not specifically shown in the figure.

Position of Exhaust Fan

The position of the exhaust fan 4 is now explained.

Figure 3:
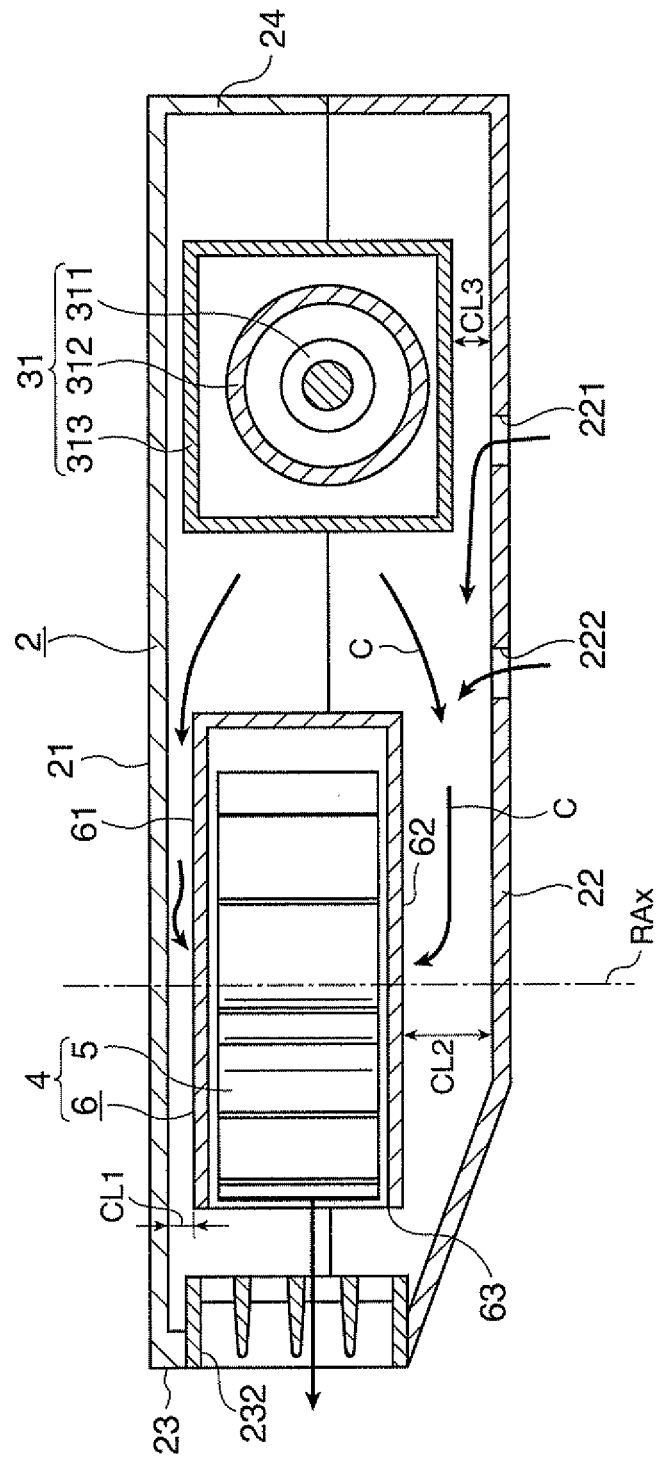
FIG. 3 shows the position of the exhaust fan according to the embodiment.
Figure 4:
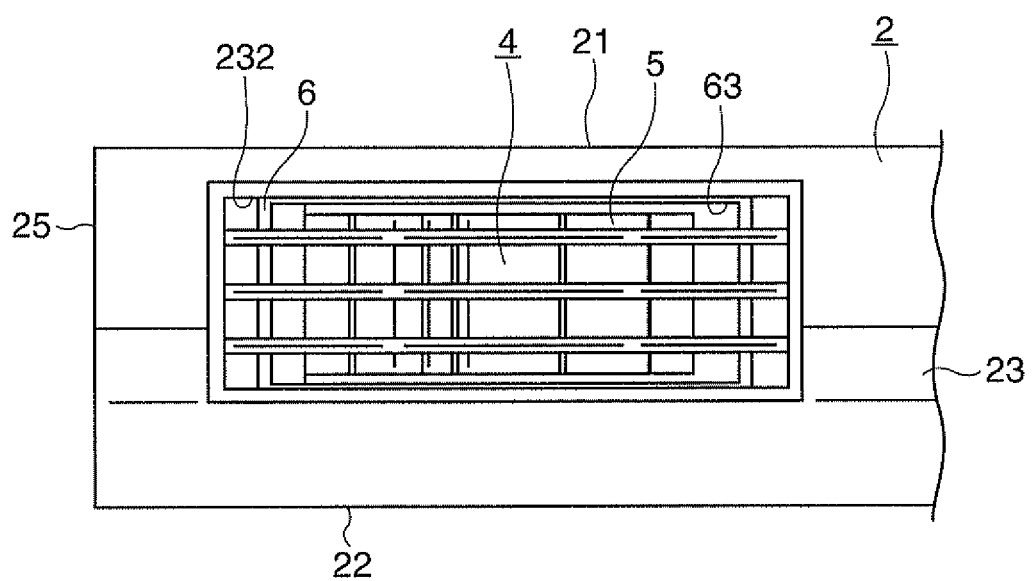
FIG. 4 shows the position of the exhaust fan according to the embodiment.

FIGS. 3 and 4 show the position of the exhaust fan 4. More specifically, FIG. 3 is a cross-sectional view taken along a line in FIG. 1, and FIG. 4 illustrates the inside of the external housing 2 as viewed from the air discharge port 232.

As illustrated in FIG. 3, the exhaust fan 4 is disposed in such a position that the air outlet port 63 faces to the air discharge port 232, and that the rotation axis RAx extends along the vertical axis on the line (line III-III) connecting the position of the air discharge port 232 and the position of the light source device 31.

Moreover, as illustrated in FIGS. 1 and 2, the exhaust fan 4 is provided in such a condition that a moving direction R2 (FIG. 2) of the plural vanes 51 on the air discharge port 232 side (air outlet port 63 side) corresponds to a direction away from the projection lens 36.

The exhaust fan 4 is supported by ribs (not shown) projecting from the bottom surface 22. This arrangement produces, a first clearance CL1 between the first air inlet port 61 and the top surface 21 and a second clearance CL2 between the second air inlet port 62 and the bottom surface 22 as illustrated in FIG. 3.

As illustrated in FIG. 4, the exhaust fan 4 whose position in the vertical direction is determined by the respective clearances CL1 and CL2 is located in such a position that the light source device 31 disposed behind the exhaust fan 4 becomes invisible when the inside of the external housing 2 is viewed from the air discharge port 232. Thus, the exhaust fan 4 blocks light emitted from the light source device 31 and traveling in directions other than the direction of a predetermined illumination optical axis Ax (FIG. 1).

The exhaust fan 4 thus positioned sucks the air within the external housing 2, particularly the air heated by the light source device 31 from the clearances CL1 and CL2 through the air inlet ports 61 and 62 in accordance with the rotation of the impeller 5 around the rotation axis RAx. Also, the exhaust fan 4 discharges the collected air from the air outlet port 63 to the outside of the external housing 2 via the air discharge port 232.

Thus, the top surface 21 and the bottom surface 22 constitute a part of a duct for guiding air from the light source device 31 to the exhaust fan 4.

According to this embodiment, the opening area of the first air inlet port 61 is larger than the opening area of the second air inlet port 62. That is, the exhaust fan 4 is constructed such that a first air intake quantity introduced through the first air inlet port 61 becomes larger than a second air intake quantity introduced through the second air inlet port 62.

The magnitude relationship between the clearances CL1 and CL2 is set opposite to the magnitude relationship between the first air intake quantity and the second air intake quantity. That is, the length of the first clearance CL1 is set smaller than the length of the second clearance CL2.

For example, when the first air intake quantity is designed to be twice larger than the second air intake quantity, it is preferable that the length of the second clearance CL2 is so designed as to become substantially twice larger than the length of the first clearance CL1.

The bottom surface 22 has a first communication hole 221 and a second communication hole 222 (FIG. 3).

The first communication hole 221 is a hole communicating with a channel C of air flowing from the light source device 31 to the second air intake port 62 to introduce air from the outside of the external housing 2 to the channel C.

As illustrated in FIG. 3, the light source device 31 is disposed such that a third clearance CL3 can be formed between the light source device 31 and the bottom surface 22.

The first communication hole 221 is provided below the light source device 31 (at a position corresponding to the position of the light source device 31 as viewed in the direction of the vertical axis) to connect the third clearance CL3 with the outside of the external housing 2.

The second communication hole 222 is a hole for introducing air from the outside of the external housing 2 into the channel C similarly to the first communication hole 221, and is disposed at a downstream position of the channel C from the first communication hole 221.

According to this embodiment, the following advantages can be offered.

In this embodiment, the exhaust fan 4 is constituted by a turbo fan, and is disposed such that the rotation axis RAx of the impeller 5 extends along the vertical axis.

Thus, the thickness of the projector 1 can be reduced without lowering the performance of the exhaust fan 4, that is, while preventing temperature increase within the external housing 2.

The exhaust fan 4 is constituted by a double-sided turbo fan having the air inlet ports 61 and 62, and is disposed such that the clearances CL1 and CL2 are produced between the exhaust fan 4 and the top surface 21 and between the exhaust fan 4 and the bottom surface 22.

According to this structure, the air within the external housing 2 can be effectively sucked through both the top surface 21 side and the bottom surface 22 side without remaining inside the external housing 2. Thus, temperature increase within the external housing 2 can be effectively prevented.

Moreover, this structure allows the air sucked by the exhaust fan 4 to flow along the rear surfaces of the top surface 21 and the bottom surface 22. Thus, temperature increase of the top surface 21 and the bottom surface 22 can also be avoided.

The relationship between the sizes of the clearances CL1 and CL2 is set opposite to the relationship between the volumes of the first air intake quantity and the second air intake quantity.

Since the first clearance CL1 for the larger air intake quantity is small, the quantities of airs flowing on the top surface 21 side and the bottom surface 22 side are balanced against each other. That is, air flows along the top surface 21 and the bottom surface 22 with a good balance. Accordingly, the exhaust fan 4 can efficiently suck air within the external housing 2.

In the structure having the communication holes 221 and 222 on the bottom surface 22, air can be introduced from the outside of the external housing 2 through the communication holes 221 and 222 into the channel C by driving the exhaust fan 4. This structure causes mixture of the air heated by the light source device 31 and the air outside the external housing 2, and thus decreases the temperature of the air sucked by the exhaust fan 4. In this case, the possibility that the exhaust fan 4 takes in high-temperature air lowers, which prevents heat deterioration of the exhaust fan 4 and the air discharge port 232. Accordingly, the necessity of using heat-resistant material for the exhaust fan 4 and the air discharge port 232 can be eliminated.

The first communication hole 221 is formed below the light source device 31. In this case, the air heated by the light source device 31 can be mixed with the air outside the external housing 2 at an upstream position of the channel C. Thus, the temperature of the air sucked by the exhaust fan 4 can be effectively decreased.

According to the structure having the first communication hole 221 below the light source device 31, temperature increase of the air in the vicinity of the light source device 31 can be effectively prevented by using the air introduced from the outside of the external housing 2 through the first communication hole 221.

Moreover, temperature increase of the area of the bottom surface 22 corresponding to the position of the light source device 31 can also be avoided by using the air introduced from the outside of the external housing 2 through the first communication hole 221.

The exhaust fan 4 is disposed such that the shift direction R2 corresponds to the direction away from the projection lens 36.

In this arrangement, interference between exhaust airflow discharged from the exhaust fan 4 via the air discharge port 232 to the outside of the external housing 2 and an image projected from the projection lens 36 can be avoided. Thus, a projection image can be displayed in a preferable condition without deterioration of the quality of the projection image displayed on the screen.

The exhaust fan 4 is disposed on the line connecting the position of the air discharge port 232 and the position of the light source device 31.

According to this structure, the exhaust fan 4 blocks light leaking from the light source device 31, and thus prevents leakage of the light to the outside of the external housing 2 through the air discharge port 232.

In this case, the necessity of equipping a light shield louver on an air discharge duct or an air discharge port provided on the air discharge side of an axial fan as required in a related-art exhaust mechanism is eliminated, which simplifies the exhaust mechanism. That is, the structure which does not include the light shield louver on the air discharge duct or the air discharge port contributes to reduction of the size, weight, and cost of the projector 1.

Moreover, the structure which does not have the light shield louver eliminates air resistance produced by the light shield louver. Thus, air discharged from the exhaust fan 4 can be discharged via the air discharge port 232 to the outside of the external housing 2 without pressure loss. Accordingly, the projector 1 secures a sufficient level of silence without generating noise associated with air resistance.

The invention is not limited to the embodiment described herein but may be practiced otherwise without departing from the scope of the invention. Therefore, modifications and improvements including the following changes may be made.

According to this embodiment, the exhaust fan 4 is constituted by a double-sided turbo fan having the air inlet ports 61 and 62. However, the exhaust fan 4 may be a single-sided turbo fan having only either the air inlet port 61 or the air inlet port 62.

According to this embodiment, the communication holes 221 and 222 are formed on the bottom surface 22. However, the communication holes 221 and 222 may be provided on the top surface 21.

According to this embodiment, the projector 1 includes the three liquid crystal panels 351. However, the invention is applicable to a projector which includes two or a smaller number, or four or a larger number of liquid crystal panels.

While the light modulation devices are constituted by transmission type liquid crystal panels in this embodiment, the light modulation devices may be reflection type liquid crystal panels. Alternatively, other types of light modulation device may be used as long as they can modulate light according to image information. For example, the invention is applicable to a projector which includes a light modulation device other than of a liquid crystal type such as a device using micromirrors. When the micromirror-type light modulation device is used, the entrance side and exit side polarization plates 352 and 353 can be eliminated.

While only the front projection type projector has been discussed in this embodiment, the invention is applicable to a rear type projector which has a screen and projects images from the back side of the screen.

The projector according to the invention capable of reducing the size of its external housing while increasing the degree of freedom for designing the external housing is suited for a projector used for presentation, home theater, or for other purposes.

What is claimed is:

1. A projector comprising:
an external housing; and an exhaust fan configured to suck an air within the external housing and discharges the sucked air to the outside, wherein the external housing has a top surface and a bottom surface each crossing a vertical axis, an air discharge port through which the air discharged from the exhaust fan is discharged to the outside, and a side surface that connects the top surface and the bottom surface, the exhaust fan is a turbo fan that has an impeller rotatable around a predetermined rotation axis, and the predetermined rotation axis extends along the vertical axis.

2. The projector according to claim 1, wherein the exhaust fan has a first air inlet port and a second air inlet port provided such that the first and second air inlet ports arranged along the rotation axis with the impeller interposed between the first and second air inlet ports, and is disposed in such a position that a first clearance is formed between the first air inlet port and the top surface and that a second clearance is formed between the second air inlet port and the bottom surface.

3. The projector according to claim 2, wherein the exhaust fan is structured so that a first air intake quantity introduced through the first air inlet port is different from a second air intake quantity introduced through the second air inlet port; and the magnitude relationship between the first clearance and the second clearance is set opposite to the magnitude relationship between the first air first intake quantity and the second air intake quantity.

4. The projector according to claim 2, further comprising:

a light source device disposed within the external housing to emit light, wherein the exhaust fan sucks the air heated by the light source device and discharges the sucked air to the outside through the air discharge port, the top surface and the bottom surface form a part of a duct configured to guide the air heated by the light source device toward the exhaust fan, and a communication hole configured to communicate with an air flow channel from the light source device to the exhaust fan to introduce air from the outside of the external housing into the channel is formed at least either on the top surface or on the bottom surface.

5. The projector according to claim 4, wherein the light source device is disposed in such a position that a third clearance is formed between the light source device and at least either the top surface or the bottom surface; and the communication hole is formed at a position corresponding to the position of the light source device as viewed in the direction along the vertical axis to connect the third clearance and the outside of the external housing.

6. The projector according to claim 1, further comprising:

a projection device disposed within the external housing to project an image, wherein the air discharge port is provided on the side surface of the side that the image is projected, the impeller has a plurality of vanes, and the exhaust fan is provided in such a condition that the moving direction of the plurality of vanes on the air discharge port side corresponds to a direction away from the projection device.

7. The projector according to claim 1, further comprising:

a light source device disposed within the external housing to emit light, wherein the exhaust fan is disposed on a line connecting the position of the air discharge port and the position of the light source device.

* * * * *